W. J. BELL.

TRIMMING ATTACHMENT FOR SEWING MACHINES.

APPLICATION FILED JAN. 13, 1916.

Reissued Sept. 26, 1916.

14,194.

William J. Bell, Inventor

By his Attorney

Thomas A. Hill.

THE NORRIS PETERS CO., PHOTO-LITHO., WASHINGTON, D. C.

UNITED STATES PATENT OFFICE.

WILLIAM J. BELL, OF BROOKLYN, NEW YORK.

TRIMMING ATTACHMENT FOR SEWING-MACHINES.

14,194. Specification of Reissued Letters Patent. Reissued Sept. 26, 1916.

Original No. 1,111,432, dated September 22, 1914, Serial No. 808,444, filed December 23, 1913. Application for reissue filed January 13, 1916. Serial No. 71,995.

*To all whom it may concern:*

Be it known that I, WILLIAM J. BELL, a citizen of the United States, residing at Brooklyn, in the county of Kings and State of New York, have invented certain new and useful Improvements in Trimming Attachments for Sewing-Machines; and I do herebv declare the following to be a full, clear, and exact description of the invention, such as will enable others skilled in the art to which it appertains to make and use the same.

The primary object of this invention is to provide a cutting or trimming attachment for sewing machines which is especially adapted for use in connection with a two-needle machine and which is of extremely simple, practical and efficient construction.

Another object of the invention is to provide a trimming attachment including a reciprocatory rod movable through a hollow presser bar and provided upon its lower end with a knife which coöperates with a cutter plate to cut work as may be desired.

Another and more specific object of the invention is to provide a trimming attachment for cutting between the stitches of picot edging.

With these and other objects in view as will become more apparent as the description proceeds, this invention consists in certain novel features of construction, combination and arrangement of parts as will be herein-after more fully described and claimed.

For a complete understanding of my invention reference is to be had to the following description and accompanying drawings, in which—

Figure 2:
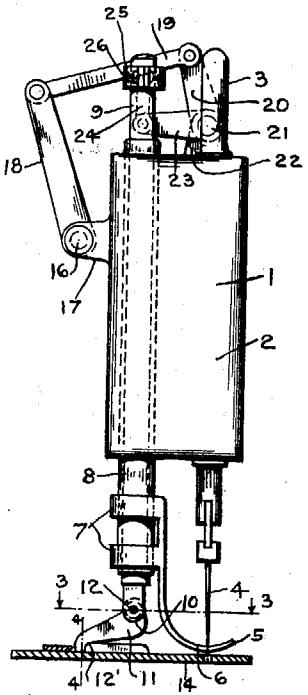
Figure 1:
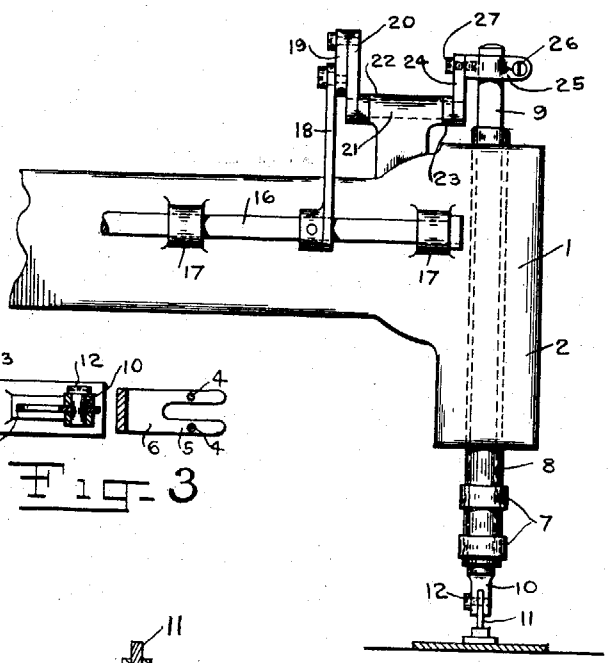
Figure 3:
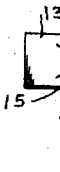
Figure 4:
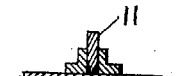

Figure 1 is a fragmentary rear elevation of the head portion of a machine, showing my attachment connected thereto, Fig. 2 is an end elevation taken on a plane at right angles to the plane of Fig. 1, Fig. 3 is a horizontal section taken on the plane of line 3—3 of Fig. 2, and Fig. 4 is a transverse section taken on the plane of line 4—4 of Fig. 2.

Referring in detail to the drawings by numerals, 1 designates, as an entirety, the head of a sewing machine, having a vertical portion 2 through which operates a vertical reciprocatory needle bar 3 carrying upon its lower end a pair of needles 4 which pass through needle openings formed in the arms 5 of a presser foot, generally designated 6. This foot is provided with attaching bands 7 which encircle a hollow or tubular presser bar 8 which latter reciprocates through the portion 2 of the head in parallel relation to, and in the rear of, the needle bar 3.

In carrying out my invention, I provide a rod 9 which extends through the hollow presser bar 8 and which projects some distance beyond each end thereof. The lower end of the bar 9 is bifurcated to form the opposed ears 10 between which a knife 11 is secured by means of a screw 12. The screw extends through alined openings formed in the ears and the knife and when tightened holds the knife rigidly against movement relative to the rod 9. By loosening the screw 12 in the alined openings formed in the ears 10, the knife 11 may be adjusted to conform to the thickness of the material being cut. Referring to Fig. 2, it will be seen that this knife extends rearwardly from the bar 9, converges toward its rear extremity, and has its cutting edge inclined rearwardly and downwardly. The extremity 12′ of the knife is extended downwardly to form a sort of bill or hook. This knife coöperates with a cutter plate 13 mounted upon the needle plate 14 and provided with a longitudinal slot 15 through which the knife passes.

The actuating means for the rod 9 includes a rock shaft 16 journaled through bearings 17 on the rear side of the head and so positioned as to hold the rock shaft at right angles to the vertical plane of the needle bar 3 and rod 9. This rock shaft is actuated by any suitable means, not shown, connected to a movable element of the machine and carries an arm 18 which extends upwardly above the head of the machine and which is connected by a link 19 to an arm 20 formed upon a rock shaft 21 supported in a bearing bracket 22. The bearing bracket 22 is supported on the head of the machine and holds the rock shaft 21 parallel to the rock shaft 16. An arm 23 extends rearwardly from the outer end of the rock shaft 21 toward the rod 9 and is pivotally connected at its rear end to a link 24 dependent from a clamp 25 carried by the upper end of the rod 9. This clamp is in the form of a band encircling the rod 9 and is held in engagement therewith by a screw 26, which when loosened, allows an adjustment of the clamp relative to the rod 9. A screw 27 connects the link 24 to the clamp 25, and, by engaging the rod 9, assists in securing the clamp in position.

From the foregoing description the construction of my trimming attachment for sewing machines will be clearly understood, and its operation may be briefly described as follows: Supposing the machine to be used for forming picot edging; the needles 4 coöperating with the remainder of the stitching mechanism, will form two parallel rows of stitching connected by cross stitches, and as the work is fed rearwardly under the presser foot 6, the knife 11 will raise and lower and sever the cross stitches which pass over the slot 15 formed in the cutter plate 13. It will, of course, be understood that my attachment may be used for other purposes than that of trimming picot edging.

While I have shown and described the preferred embodiment of my invention, it will be understood that minor changes in construction, combination and arrangement of parts may be used without departing from the spirit and scope of the invention as claimed.

Having thus described my invention, I claim:—

1. In combination with a sewing machine having a hollow presser bar, a rod slidable through said bar, means for reciprocating said rod, a knife secured to one end of the rod, and a slotted cutter plate for coöperation with the knife.

2. In combination with a sewing machine having a hollow presser bar, a rod slidable through said presser bar, means for reciprocating the rod, the lower end of the rod being bifurcated, a knife, means for adjustably securing the knife to the bifurcated end of said rod, and a slotted cutter plate for coöperation with the knife.

3. The combination with the presser foot bar of a hemstitch sewing machine, of the usual rock shaft, and presser foot bracket attachment having a presser foot, cutting mechanism comprising a member operatively connected to said rock shaft, another cutting member in cutting relation with said first mentioned member, and both of said members in the line of feed beyond said presser foot.

4. The combination with the presser foot bar of a hemstitch sewing machine, of the usual rock shaft, and presser foot bracket attachment having a presser foot, cutting mechanism comprising two members, one of said members operatively connected to said rock shaft, and both of said cutting members in the line of feed beyond said presser foot.

Signed at the city, county and State of New York, this 10th day of January, 1916.

WILLIAM J. BELL.

Witnesses:

LOUISE ENDERLE,
THOMAS A. HILL.

Copies of this patent may be obtained for five cents each, by addressing the "Commissioner of Patents, Washington, D. C."